(12) United States Patent
Park et al.

(10) Patent No.: US 6,912,724 B2
(45) Date of Patent: *Jun. 28, 2005

(54) CARTRIDGE FOR AN INFORMATION RECORDING MEDIUM

(75) Inventors: Jong-pil Park, Suwon (KR); In-sik Park, Suwon (KR); Young-sun Seo, Sungnam (KR); Jung-wan Ko, Yongin (KR); Han-kook Choi, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 10/677,220

(22) Filed: Oct. 3, 2003

(65) Prior Publication Data

US 2004/0071076 A1 Apr. 15, 2004

Related U.S. Application Data

(60) Continuation of application No. 09/949,870, filed on Sep. 12, 2001, now Pat. No. 6,728,200, which is a division of application No. 09/313,787, filed on May 17, 1999, now Pat. No. 6,445,677.

(30) Foreign Application Priority Data

| Sep. 9, 1919 | (KR) | 98-37104 |
| Mar. 23, 1998 | (KR) | 98-18684 |
| Aug. 26, 1998 | (KR) | 98-34561 |

(51) Int. Cl.⁷ ............................................. G11B 23/03

(52) U.S. Cl. ...................................... 720/733; 720/737

(58) Field of Search ................................ 720/725, 728, 720/732, 733, 737

(56) References Cited

U.S. PATENT DOCUMENTS

| 4,109,919 A | 8/1978 | Elliott et al. |
| 4,455,642 A | 6/1984 | Inaba |
| 4,463,850 A | 8/1984 | Gorog |
| 4,609,105 A | 9/1986 | Manes et al. |

(Continued)

FOREIGN PATENT DOCUMENTS

| CN | 1090423 A | 8/1994 |
| DE | 4012669 | 10/1990 |
| DE | 4340601 | 6/1994 |
| DE | 4340761 | 6/1994 |

(Continued)

OTHER PUBLICATIONS

U.S. Appl. No. 09/949,870, (6,728,200), filed Sep. 12, 2001, Jong-pil Park, et al.

(Continued)

Primary Examiner—William J Klimowicz
(74) Attorney, Agent, or Firm—Stein, McEwen & Bui, LLP

(57) ABSTRACT

A cartridge for an information recording medium includes a cartridge case, an opening cover, detachably mounted to a rear side opening of the cartridge case, for enabling the information recording medium to be withdrawn or inserted with respect to the cartridge case, and a holding unit for preventing movement of the information recording medium by supporting the information recording medium when the information recording medium is received and/or withdrawn into/from the cartridge case. The holding unit includes a pair of elastic pressure parts, elastically formed on the opening cover, for elastically supporting the information recording medium to prevent movement of the information recording medium when the opening cover is not attached to the cartridge case, and a release unit for releasing the pair of elastic pressure parts when the opening cover is attached to the cartridge case so that the information recording medium is rotatable in the cartridge case.

5 Claims, 5 Drawing Sheets

U.S. PATENT DOCUMENTS

| | | | |
|---|---|---|---|
| 4,702,369 A | 10/1987 | Philosophe | |
| 4,773,058 A | 9/1988 | Petruchik et al. | |
| 4,819,114 A | 4/1989 | Bernitt et al. | |
| 4,849,958 A | 7/1989 | Douwes et al. | |
| 4,928,271 A | 5/1990 | Verhagen | |
| 5,093,823 A | 3/1992 | Ouwerkerk et al. | |
| 5,140,489 A | 8/1992 | Barnard | |
| 5,499,233 A | 3/1996 | Childers et al. | |
| 5,526,337 A | 6/1996 | Housey et al. | |
| 5,537,389 A | 7/1996 | Kuwa et al. | |
| 5,548,571 A | 8/1996 | Mistretta | |
| 5,548,577 A | 8/1996 | Miyazaki et al. | |
| 5,581,540 A | 12/1996 | Dang | |
| 5,724,332 A | 3/1998 | Ogusu | |
| 5,748,609 A | 5/1998 | Tanaka | |
| 5,768,253 A | 6/1998 | Tricart | |
| 5,878,879 A | 3/1999 | Liao | |
| 5,903,541 A | 5/1999 | Mizutani et al. | |
| 5,910,941 A | 6/1999 | Mizutani | |
| 5,943,197 A | 8/1999 | Funawatari et al. | |
| 6,052,359 A | 4/2000 | Fujiura | |
| 6,078,562 A | 6/2000 | Kikuchi | |
| 6,078,563 A | 6/2000 | Goto et al. | |
| 6,108,298 A | 8/2000 | Miyazaki et al. | |
| 6,125,102 A | 9/2000 | Tricart | |
| 6,172,962 B1 | 1/2001 | Goto et al. | |
| 6,205,115 B1 | 3/2001 | Ikebe et al. | |
| 6,215,761 B1 | 4/2001 | Goto et al. | |
| 6,366,553 B1 | 4/2002 | Takahashi | |
| 6,426,938 B2 * | 7/2002 | Lim et al. | 369/291 |
| 6,438,099 B2 * | 8/2002 | Park et al. | 369/291 |
| 6,445,677 B1 * | 9/2002 | Park et al. | 369/291 |
| 6,529,471 B1 * | 3/2003 | Lim et al. | 369/291 |
| 6,728,200 B2 * | 4/2004 | Park et al. | 369/291 |
| 6,757,240 B2 * | 6/2004 | Lim et al. | 369/291 |

FOREIGN PATENT DOCUMENTS

| | | | |
|---|---|---|---|
| EP | 0145051 | 6/1985 | |
| EP | 0768662 | 4/1997 | |
| EP | 768669 | 4/1997 | |
| EP | 0838819 | 4/1998 | |
| EP | 0244884 | 12/1998 | |
| EP | 0902428 | 3/1999 | |
| EP | 1067548 A1 * | 1/2001 | G11B/23/03 |
| GB | 2272990 | 2/1993 | |
| GB | 2272990 | 6/1994 | |
| JP | 60-229286 | 11/1985 | |
| JP | 6-150603 | 5/1994 | |
| JP | 09-219080 | 8/1997 | |
| JP | 10-50025 | 2/1998 | |
| JP | 10144031 A * | 5/1998 | G11B/23/03 |
| JP | 11-213596 | 8/1999 | |
| JP | 2000195217 A * | 7/2000 | G11B/23/03 |
| RU | 1794260 | 2/1993 | |

OTHER PUBLICATIONS

U.S. Appl. No. 09/313,787 (Issued as U.S. Patent No. 6,445,677), filed May 17, 1999, Jong–pil Park, et al.

U.S. Appl. No. 09/964,632 (Issued as U.S. Patent No. 6,438,099), filed Sep. 28, 2001, Jong–pil Park, et al.

U.S. Appl. No. 10/678,257, filed Oct. 6, 2003, Jong–pil Park, et al.

* cited by examiner

CARTRIDGE FOR AN INFORMATION RECORDING MEDIUM

CROSS-REFERENCE TO RELATED APPLICATIONS

This application is a continuation of U.S. patent application Ser. No. 09/949,870, filed Sep. 12, 2001 in the U.S. Patent and Trademark Office, which is now U.S. Pat. No. 6,728,200, which is a divisional of U.S. patent application Ser. No. 09/313,787, filed May 17, 1999 and which issued as U.S. Pat. No. 6,445,677, which claims the benefit of Korean Application Nos. 98-18684, filed May 23, 1998; 98-34561, filed Aug. 26, 1998; and 98-37104, filed Sep. 9, 1998 in the Korean Patent Office, the disclosures of which are incorporated herein by reference.

BACKGROUND OF THE INVENTION

1. Field of the Invention

The present invention relates to a cartridge for accommodating and protecting an information recording medium such as an optical disc so that information is recordable/reproducible on/from the optical disc. More particularly, the present invention relates to a cartridge which has an information recording medium holding means that enables a user to replace the information recording medium without directly touching the same, and prevents the information recording medium from separating from the cartridge while the user replaces the same.

2. Description of the Related Art

As it is generally known, a disc cartridge protects a disc such as an optical disc from dust, fingerprints, scratches, etc., so that information may be recorded/reproduced on/from the disc without an error. Such a cartridge includes a case which is generally made from a synthetic resin, and an opening cover which selectively opens/closes a disc entry opening of the case.

One example of a conventional disc cartridge is shown in FIG. 1. In FIG. 1, a reference numeral 10 refers to a cartridge case, which has an upper shell and a lower shell that are coupled with each other to define a space therebetween. A disc d is accommodated in the space defined by the upper and lower shells. A spindle opening 10a and an extended opening 10b are formed in the upper and lower shells. Thus, a turntable and a chucking clamper of an optical recording/reproducing device (not shown) are advanced through the spindle opening 10a, and a recordable side of the disc d is exposed to an optical pickup through the extended opening 10b. A shutter 12 is slidably disposed on the cartridge case 10, to selectively open/close the spindle opening 10a and the extended opening 10b. The shutter 12 is automatically opened/closed in response to the inserting and withdrawing actions of the disc cartridge with respect to the optical recording/reproducing device.

Further, a plurality of sensing holes 10c, 10d, 10e, and 10f are formed in the cartridge case 10, corresponding to a plurality of sensing switches of the optical recording/reproducing device which are to be selectively inserted thereinto. Accordingly, the states of the disc d are detected. The sensing holes 10c, 10d, 10e, and 10f are divided into an A1 hole 10c for detecting whether or not the disc d has been withdrawn from the cartridge case 10, an A2 hole 10d for detecting whether the disc d is a single-sided or a double-sided, a spare hole 10e which is available for use for an additional function, and a protection hole 10f for preventing information from being recorded on the disc d. In addition to the sensing holes 10c, 10d, 10e, and 10f, additional holes such as a position hole are formed in the cartridge case 10, albeit they are not shown in the drawings.

Further, an opening cover 14 is hinged to a rear side of the cartridge case 10 to permit the disc d to be inserted or withdrawn with respect to the cartridge case 10. A plurality of holes 14a are formed in the opening cover 14 to correspond to the sensing holes 10c, 10d, 10e, and 10f, respectively. A lock lever 14b is disposed on the opening cover 14 to be locked into a lock hole 10g of the cartridge case 10, and a protector arm as well as a protector rib (not shown) are integrally formed on the cartridge case 10 by injection molding. The protector arm is positioned in the protection hole 10f, and the rib is to be locked with the protector arm.

Initially, the A1 hole 10c is closed by the protector rib. Then, if the disc d is withdrawn from the cartridge case 10, the rib is eliminated so that the A1 hole 10c is opened. Accordingly, the sensing switch of the optical recording/reproducing device is inserted into the A1 hole 10c when the disc cartridge is inserted into the optical recording/reproducing device, so that it is determined that the disc d has been exchanged. As a result, the verification process on the disc d is carried out. The A2 hole 10d is excluded if the disc d accommodated in the cartridge case 10 is single-sided, or when the disc cartridge is one that does not allow the disc d to be exchanged.

Thus, when the conventional disc cartridge constructed as above is inserted into the optical recording/reproducing device, the shutter 12 of the cartridge case 10 is moved in a predetermined direction (upper left in FIG. 1) by a shutter opening/closing device (not shown), and accordingly, the spindle opening 10a and the extended opening 10b of the cartridge case 10 are opened. Simultaneously, the turntable and the chucking damper of the optical recording/reproducing device are advanced through the spindle opening 10a so that the disc d is positioned and chucked.

Further, a position pin (not shown) of the optical recording/reproducing device is inserted into the position hole so that the position of the disc cartridge with respect to the optical recording/reproducing device is determined. Continuously, the sensing switches of the optical recording/reproducing device are selectively inserted into the sensing holes 10c, 10d, 10e, and 10f and their respective corresponding holes 14a of the opening cover 14, so that the states of the disc d are determined. When the sensing switch corresponding with the A1 sensing hole 10c is not inserted into the A1 sensing hole 10c, then it is determined that the disc d has never been exchanged, so that information can be directly recorded on the disc d without the verification process. When the corresponding sensing switch is inserted into the A1 hole 10c, then it is determined that the disc d has been exchanged, so that the verification process is carried out and then the information is recorded on the disc d. Further, when the corresponding sensing switch corresponding with the A2 hole 10d is inserted into the A2 hole 10d, it is determined that the disc d is double-sided, and if not, it is determined that the disc d is single-sided. When the corresponding sensing switch is inserted into the protection hole 10f, it is determined that the function for preventing information recording/elimination is selected.

Meanwhile, in the above-described disc cartridge, the disc d accommodated within the cartridge case is exchangeable. When exchanging the disc d, first, the user opens the opening cover 14 which is hinged at the rear side of the cartridge case 10. Then, the user tilts the cartridge case 10 and pulls out the disc d manually so as to slide the disc d out of the cartridge case 10. The user has to hold the disc d with his/her hand, too, when placing the disc d into the cartridge case 10.

Accordingly, after opening the opening cover 14 in order to exchange the disc, the user holds the recordable side of the disc by his/her hand while he/she takes out or inserts the disc with respect to the cartridge case. Accordingly, a problem arises in that the recordable side of the disc may be damaged due to scratches, fingerprints, etc., which are made by the user while he/she exchanges the disc.

Further, in the event that the cartridge case and the opening cover are deformed in the manufacturing process, a gap is formed between the cartridge case and the opening cover so that foreign substances such as dust may reach the disc through the gap. Accordingly, an error may occur in recording/reproducing the information on/from the disc.

SUMMARY OF THE INVENTION

The present invention has been developed to overcome the above-described problems of the related art, and accordingly, it is an object of the present invention to provide a cartridge for attaching/detaching an opening cover with respect to a cartridge case so as to place/withdraw the disc in/from the cartridge case automatically, so that damage to the disc which is caused by a manual exchange is prevented.

Another object of the present invention is to provide a cartridge for preventing foreign substances from entering an inner portion of the cartridge case by ensuring that there is not any gap between the cartridge case and the opening cover when the opening cover is attached to the cartridge case (in a closed state over (blocking) the opening of the cartridge case which receives the disc).

Additional objects and advantages of the invention will be set forth in part in the description which follows and, in part, will be obvious from the description, or may be learned by practice of the invention.

The above and other objects and advantages of the present invention will be achieved by providing a cartridge for an information recording medium which includes a cartridge case, an opening cover, detachably mounted to a rear side opening of the cartridge case, for enabling the information recording medium to be withdrawn or inserted with respect to the cartridge case, and holding means for preventing movement of the information recording medium by supporting the information recording medium when the information recording medium is received and/or withdrawn into/from the cartridge case.

Here, the holding means includes a pair of elastic pressure parts, elastically formed on the opening cover, for elastically supporting the information recording medium to prevent the movement of the information recording medium when the opening cover is not attached to the cartridge case, and release means for releasing the pair of elastic pressure parts when the opening cover is attached to the cartridge case so that the information recording medium is rotated in the cartridge case.

According to an aspect of the present invention, a space between the pair of elastic pressure parts is widened to a maximum value that is less than the width of the cartridge case. The holding means further includes supporting ribs which have guide grooves for guiding the information medium while the information recording medium is fixed with respect to the opening cover.

The release means includes receiving ribs integrally formed on leading ends of the pair of elastic pressure parts, respectively, and intervening members, formed on opposite inner sidewalls of the cartridge case, for slidably contacting the receiving ribs so as to push the receiving ribs when the opening cover is inserted into the cartridge case so that the pair of elastic pressure parts widen in a lateral direction of the information recording medium. Here, the receiving ribs have outwardly inclined surfaces that have a predetermined degree of inclination, and the intervening members have receiving recesses which have the inclined surfaces corresponding to the outwardly inclined surfaces. The intervening members may be wedge-shaped or cylindrical-shaped.

According to another aspect of the present invention, the cartridge further includes means for firmly fastening the opening cover to the cartridge case to prevent a gap between the opening cover and the cartridge case when the opening cover is attached to the cartridge case.

According to yet another aspect of the present invention, the cartridge further includes positioning means for positioning the information recording medium accommodated in the cartridge case upward/downward at an exact position.

Further, the cartridge of the present invention further includes a gripping part formed at the front portion of the opening cover. Symbols or characters are printed on the gripping part to indicate a first side and a second side of the information medium.

Meanwhile, a disc is preferably used as the information recording medium on/from which information is optically recorded and/or reproduced. A shutter for selectively opening/closing the spindle opening and the extended opening formed in the cartridge case, is slidably disposed with respect to the cartridge case.

Accordingly, the information recording medium can be inserted or withdrawn with respect to the cartridge case via the opening cover which supports the information recording medium with the holding means and attached or detached with respect to the cartridge case. As a result, the user does not have to touch the information recording medium, directly, so that disc damage caused by fingerprints, scratches, etc., is prevented.

BRIEF DESCRIPTION OF THE DRAWINGS

The above objects and advantages will be more apparent by describing the present invention with reference to the accompanied reference drawings, in which.

DETAILED DESCRIPTION OF THE PREFERRED EMBODIMENTS

Figure 1:
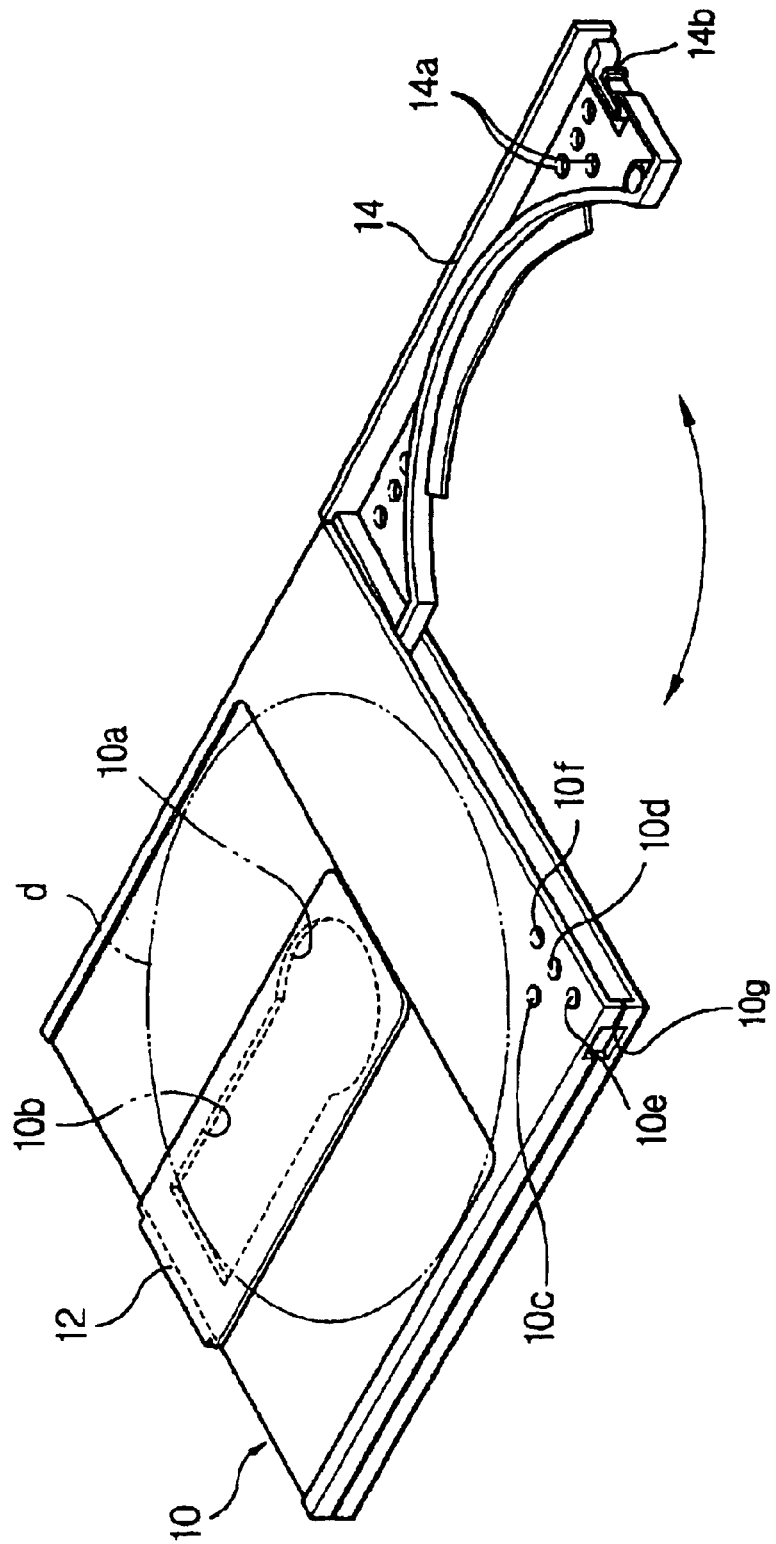
FIG. 1 is a perspective view of a conventional disc cartridge.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
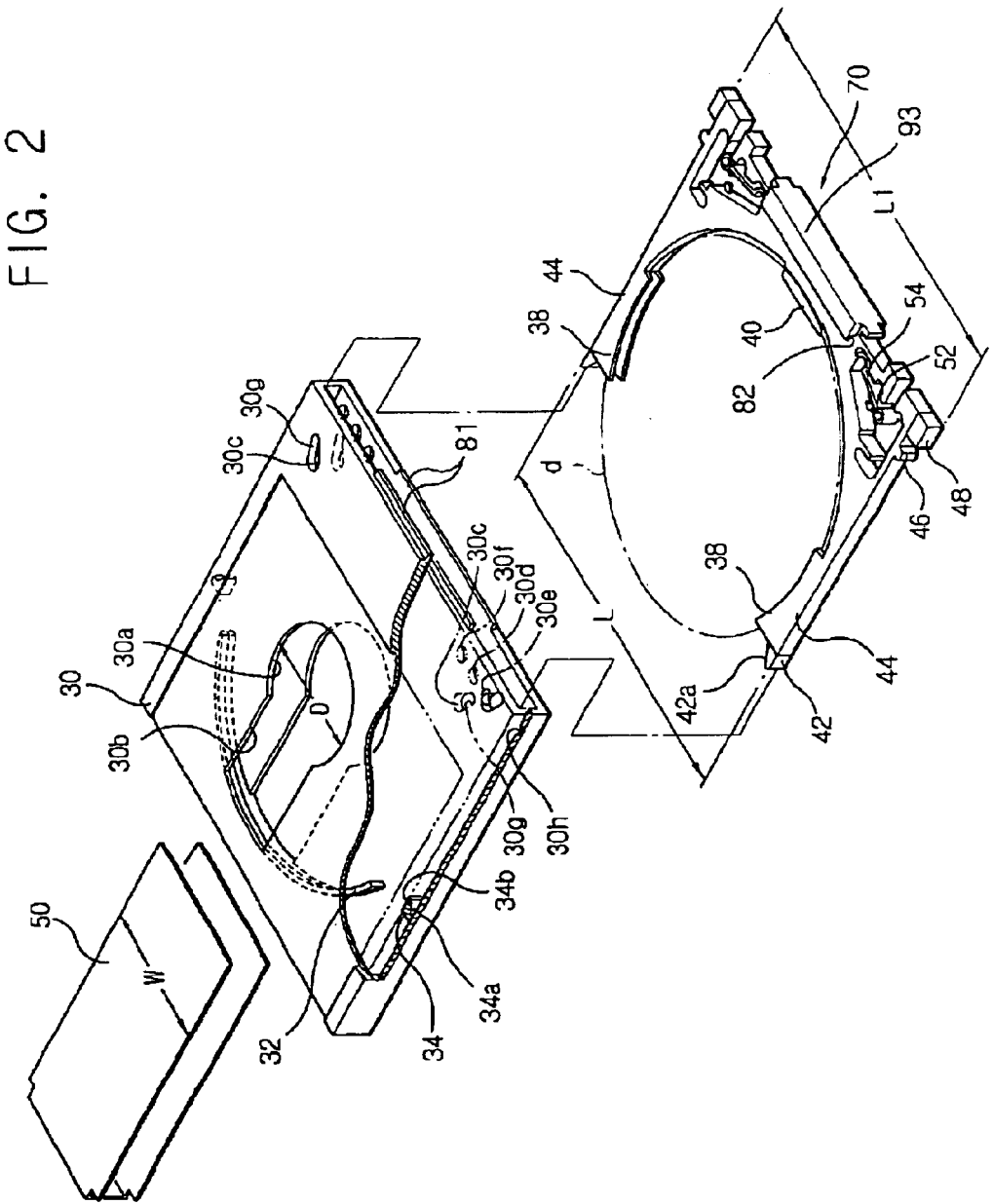
FIG. 2 is an exploded perspective view of a disc cartridge according to an embodiment of the present invention.
Figure 3:
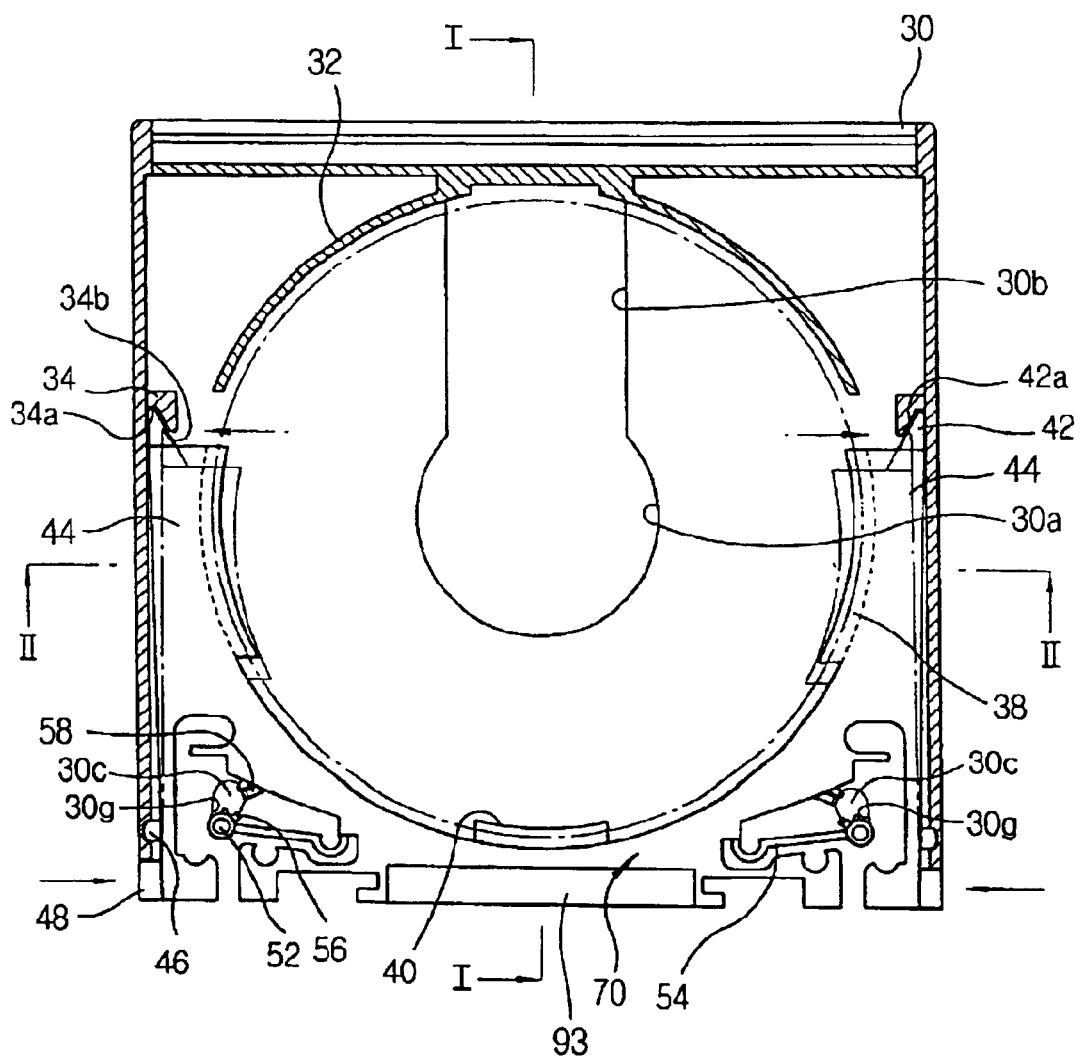
FIG. 3 is a transverse cross-sectional view showing the disc cartridge of FIG. 2 fully assembled.
Figure 4:
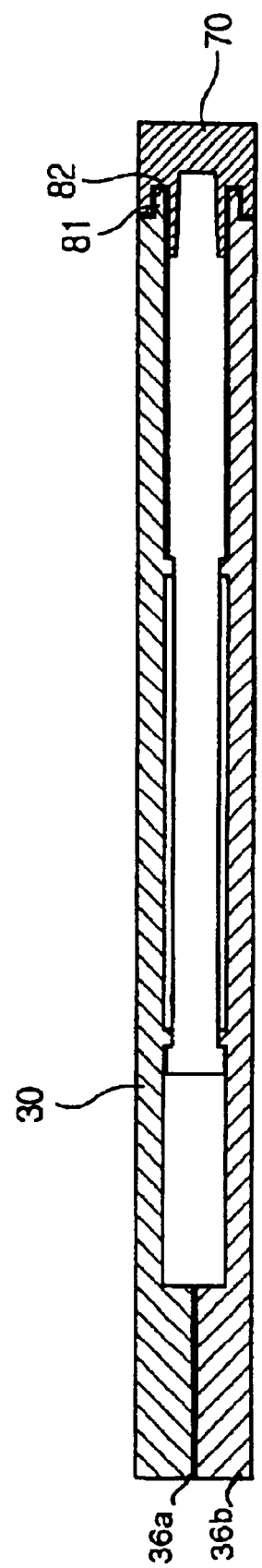
FIG. 4 is a cross-sectional view taken along line I—I of FIG. 3, showing an opening cover which is coupled with a cartridge case of the disc cartridge according to the embodiment of the present invention.
Figure 5:
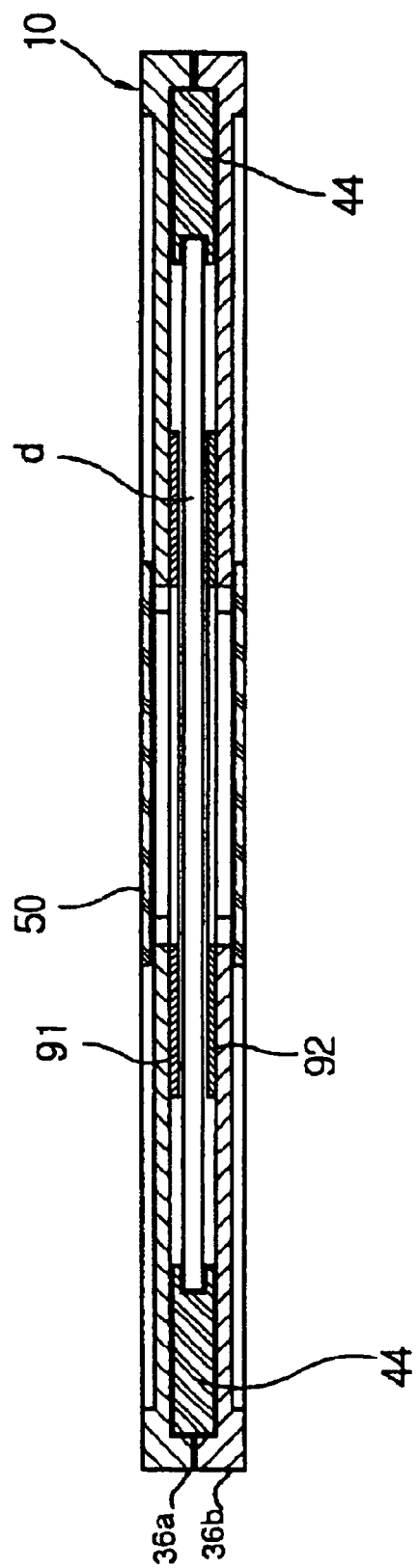
FIG. 5 is a cross-sectional view taken on line II—II of FIG. 3, showing the states of a disc which is accommodated in an inner portion of a cartridge case of the disc cartridge shown in FIG. 2 according to the embodiment of the present invention.

FIG. 2 is an exploded perspective view of a disc cartridge according to an embodiment of the present invention, and FIG. 3 shows the disc cartridge fully assembled. FIG. 4 shows an opening cover coupled with the disc cartridge, and FIG. 5 is a sectional view showing a disc accommodated in the inner portion of a cartridge case shown in FIG. 2.

Throughout the description of the preferred embodiment of the present invention, an information recording medium is referred to as a disc. It will be noted, however, that the information recording medium is not exclusively limited to the disc in the present invention.

As shown in the figures, the disc cartridge according to the preferred embodiment of the present invention includes a cartridge case 30, a shutter 50, and an opening cover 70. A space is defined within the cartridge case 30 and a disc d is accommodated in the space. The shutter 50 is disposed on the cartridge case 30 to selectively open/close a spindle opening 30a and an extended opening 30b of the cartridge case 30. The opening cover 70 is detachably mounted to a disc entry opening 37 at a rear side of the cartridge case 30.

Further, the disc cartridge according to the embodiment present invention includes a plurality of sensing holes 30c, 30d, 30e, and 30f, opening/closing means, and disc holding means. The plurality of sensing holes 30c, 30d, 30e, and 30f perform the same functions as the plurality of sensing holes 10c, 10d, 10e, and 10f, respectively. Accordingly, as a plurality of sensing switches (not shown) provided to an optical recording/reproducing device are selectively inserted into the sensing holes 30c, 30d, 30e, and 30f, the states of the disc d are determined. The opening/closing means selectively opens/closes the sensing holes 30c, 30d, 30e, and 30f, based on the states of the disc d. The disc holding means is provided to the opening cover 70 to hold the disc d while the disc is exchanged, thereby enabling the disc d to be withdrawn and/or inserted from/to the cartridge case 30 via the opening cover 70.

Here, the shutter 50, the sensing holes 30c, 30d, 30e, and 30f, and the sensing hole opening/closing means are not considered to be essential elements in the embodiment of the present invention. Accordingly, the elements are exclusive, but the disc holding means will be described in greater detail hereinafter.

An arc rib 32 is formed on an inner side of the cartridge case 30 by injection molding to support the disc d. The plurality of sensing holes 30c, 30d, 30e, and 30f are formed in a diagonal direction on upper and lower shells of the cartridge case 30, so that the states of the disc d which is accommodated in the cartridge case 30 are sensed by an optical recording/reproducing device (not shown). It is preferable that the plurality of sensing holes 30c, 30d, 30e and 30f may be formed on the upper or lower shell of cartridge case 30 for the cartridge case for a single-sided disc. Additionally, locking recesses 30h are formed at opposite inner sidewalls of the cartridge case 30, more particularly, at a place adjacent to the disc entry opening 37 where the opening cover 70 is attached. Here, the arc rib 32 has a diameter greater than the diameter of the disc d, in order to permit the accommodated disc d in the cartridge case 30 to be smoothly rotated.

The shutter 50 is for opening the spindle opening 30a and the extended opening 30b of the cartridge case 30. When the disc cartridge is inserted into the optical recording/reproducing device, the shutter 50 is moved in a predetermined direction by shutter opening/closing means (not shown) so that the spindle opening 30a and the extended opening 30b are opened. Here, the width W of the shutter 50 is greater than the diameter D of spindle opening 30a, and the diameter D of the spindle opening 30a is greater than the diameter of a turntable and a chucking damper (not shown) for rotating and chucking the disc d, so that the turntable and the chucking damper are advanced through the spindle opening 30a, smoothly.

Like a drawer, the opening cover 70 is attached/detached to/from the cartridge case 30 by being pulled out/pushed in, and a pair of locking projections 46 are formed at opposite sides of the opening cover 70 to correspond with the locking recesses 30h of the cartridge case 30. Accordingly, when the opening cover 70 is pushed into the disc entry opening 37 of the cartridge case 30, the locking projections 46 of the opening cover 70 are fixedly locked in the locking recesses 30h of the cartridge case 30, respectively, so that the opening cover 70 is securely attached to the cartridge case 30. Also, tension ribs 48 are formed on both sides of the opening cover 70 to release the locking projections 46 when the opening cover 70 is to be detached from the cartridge case 30. More specifically, if the user pushes the tension ribs 48 while pulling out the opening cover 70, the locking projections 46 are unlocked from the respective locking recesses 30h so that the opening cover 70 is detached from the cartridge case 30.

Meanwhile, opening/closing means for selectively opening/closing the A1 holes 30c is provided to both sides of the opening cover 70, and more particularly, at the places corresponding with the sensing holes 30c, 30d, 30e, and 30f, particularly corresponding to the A1 holes 30c. The opening/closing means includes movement holes 30g, rotary arms 52, and tension levers 54. The movement holes 30g are formed in the opening cover 70, in a manner that the movement holes 30g include the A1 holes 30c, respectively. In other words, one A1 hole 30c, as shown in FIGS. 2 and 3, is formed at a portion of the movement hole 30g. Each of the A1 holes 30c is communicated with each of the movement holes 30g which provides a space for the rotary arms 52 to move therein. The rotary arms 52 are movably disposed on the opening cover 70, at a place corresponding with the movement holes 30g. The tension levers 54 are extended from the opening cover 70 to movably support the rotary arms 52 and to return the rotary arms 52 to their initial positions. Stopping projections 56, as shown in FIG. 3, are integrally formed on the rotary arms 52, and stopping ribs 58 corresponding to the stopping projections 56 as shown in FIG. 3, are formed on the opening cover 70, adjacent to a place corresponding with the A1 holes 30c. Accordingly, when the rotary arms 52 are moved to the A1 holes 30c, the stopping projections 56 are stopped by the stopping ribs 58, so that the rotary arms 52 are maintained in a place to where the rotary arms 52 are moved. When the rotary arms 52 are pushed, the stopping projections 56 are released from the stopping ribs 58 so that the rotary arms 52 are returned to their initial positions by the tension of the tension ribs 54.

Further, disc holding means, which is the main feature of the present invention, is provided on the opening cover 70 and the cartridge case 30. The disc holding means includes a pair of elastic pressing parts 44, supporting ribs 38 and 40, and release means. The elastic pressure parts 44 are extended from both sides of the opening cover 70 to define a space (disc accommodating space) therebetween, and have an elasticity toward a middle portion of the opening cover 70 to elastically support the disc d in a lateral direction. The supporting ribs 38 and 40 are formed along a disc supporting part of the opening cover 70, and have guide grooves for receiving the edge of the disc d. The release means widens the space between the elastic pressure parts 44 elastically supporting the disc d so that the disc d can be rotated smoothly when the opening cover 70 is attached to the cartridge case 30.

The release means includes receiving ribs 42 formed on the opening cover 70, and intervening members 34 formed on the cartridge case 30. The receiving ribs 42 have outwardly inclined surfaces 42a, respectively, which are formed on leading ends of the elastic pressure parts 44. The intervening members 34 are wedge-shaped, and are formed on opposite inner sidewalls of the cartridge case 30 at positions corresponding to the receiving ribs 42. The intervening members 34 have receiving recesses 34a which have inclined surfaces 34b that correspond with the outwardly inclined surfaces 42a of the receiving ribs 42. Thus, when the opening cover 70 is attached to the cartridge case 30, the outwardly inclined surfaces 42a of the receiving ribs 42 and the inclined surfaces 34b of the intervening members 34 come in contact with each other, so that the receiving ribs 42 are inserted into the receiving recesses 34a of the intervening members 34, respectively. Accordingly, the elastic pressure parts 44 are forced outward from each other in a lateral direction. Here, as shown in FIG. 3, the supporting ribs are respectively formed as first supporting ribs 38 formed at both elastic pressure parts 44 to support the disc d on the intermediate portion thereof in a lateral direction, and as a second supporting rib 40 formed at the opening cover 70 to support the disc d from the rear part of the cartridge case 30. Alternatively, the first supporting ribs 38 may be respectively extended to the second supporting rib. Therefore, the supporting ribs 38 and 40 may be integrally formed along the disc supporting part of the opening cover 70, although such is not shown in the figures.

Further, the intervening members 34 may be wedge-shaped having the receiving recesses 34a as shown in the figures, or, alternatively, the intervening members 34 may be in cylindrical-shaped, although such is not shown in the figures. The cylindrical intervening members push the receiving ribs 42 while the intervening members are slid along the outwardly inclined surfaces 42a of the receiving ribs 42.

By employing the opening cover 70 having the disc holding means as above, the disc d can inserted or withdrawn into/from the cartridge case 30 without directly touching the disc d. More specifically, when replacing (or exchanging) the disc d, the opening cover 70 is detached from the cartridge case 30 so that the disc d is withdrawn from the cartridge case 30 together with the opening cover 70 while the disc holding means supports the disc d. It is because when the opening cover 70 is attached to the cartridge case 30, the receiving ribs 42 on the leading ends of the elastic pressure parts 44 widen in the lateral direction by insertion of the receiving ribs 42 into the receiving recesses 34a of the intervening members 34 of the cartridge case 30. When the opening cover 70 is pulled so as to be detached from the cartridge case 30, the elastic pressure parts 44 are returned to their initial positions by withdrawing of the receiving ribs 42 from the receiving recesses 34a of the intervening members 34 so that the elastic pressure parts 44 elastically support the disc d. After replacing the disc d with a new one so as to be supported by the disc holding means of the opening cover 70, the opening cover 70 including the disc d is attached to the cartridge case 30, so that the receiving ribs 42 of the elastic pressure parts 44 are inserted into the receiving recesses 34a of the intervening members 34 of the cartridge case 30. Accordingly, the elastic pressure parts 44 are forced outward from each other and the disc d can be rotated in the cartridge case smoothly. Here, it is preferable that the maximum width between the elastic pressure parts 44 is less than the width of the cartridge case 30, when the elastic pressure parts 44 are forced outward from each other by the release means.

Due to the structure and operation of the disc holding means, the disc d which is accommodated in the cartridge case 30 can be withdrawn via the opening cover 70 without being damaged.

FIG. 4 is a cross-sectional view taken along line I—I of FIG. 3 showing the opening cover 70 which is coupled to the cartridge case 30. As shown in FIG. 4, the disc cartridge according to the embodiment of the present invention further includes means for firmly fastening the opening cover 70 to the cartridge case 30, thereby preventing a gap between the opening cover 70 and the cartridge case 30. The fastening means includes coupling ribs 81 and rib recesses 82. The coupling ribs 81 are formed on upper and lower shells 36a, 36b of the cartridge case 30, respectively, and more specifically at places corresponding to part of the opening cover 70 that attaches to the cartridge case 30. The rib recesses 82 are formed in the opening cover 70 to receive the coupling ribs 81. Due to the incorporation of the coupling ribs 81 within the rib recesses 82, there is no gap defined between the opening cover 70 and the cartridge case 30 when the opening cover 70 is attached to the cartridge case 30. Accordingly, foreign substances such as dust, etc., do not enter the cartridge case 30.

Further, the disc cartridge according to the embodiment of the present invention further includes positioning means for positioning the disc d received in the cartridge case 30 upward/downward at an exact position. As shown in FIG. 5, the positioning means includes stepped parts 91 and 92 which are formed on upper and lower inner surfaces of the cartridge case 30 at predetermined heights, respectively. Further, the positioning means may include circular bands having a predetermined height that are attached to the upper and lower inner surfaces of the cartridge case 30. Here, the heights of the stepped parts 91 and 92, or the height of the circular bands is equal to, or greater than the thickness of the supporting ribs 38.

Due to the positioning means of the cartridge case 30 having the stepped parts 91 and 92, or the circular bands, the disc d accommodated in the cartridge case 30, is adjusted upward/downward and positioned at the exact position. Accordingly, when the user attempts to take out the disc d accommodated in another cartridge case by using the opening cover 70 which includes the holding means according to the embodiment of the present invention, the user may simply attach the opening cover 70 to the cartridge case 30 of the other disc cartridge. Then, the disc d is withdrawn from the other disc cartridge, while being supported by the holding means of the opening cover 70 of this cartridge case 30.

Further, as shown in FIGS. 2 and 3, the disc cartridge according to the embodiment of the present invention further includes a gripping part 93 which is formed on the front surface of the opening cover 70. Accordingly, the user grips the gripping part 93 by his/her hand and attaches/detaches the opening cover 70 to/from the cartridge case 30 using the gripping part 93. Symbols or characters may be printed on the gripping part 93 to indicate a first side and a second side of the disc d. Accordingly, the user may easily distinguish each side of the disc d.

Hereinafter, the operation of the disc cartridge which is constructed as described above will be described in greater detail.

First, descriptions of the processes which follow the insertion of the disc cartridge into the optical recording/reproducing device, i.e., the process of shutter 50 opening, disc d positioning and chucking, disc states detecting, etc., will be omitted, since they have been described earlier in the description of the related art. Hereinafter, the operation of the disc holding means will be described.

In order to replace the disc d with the bare disc d whose states are verified in the cartridge case 30, the user eliminates a protector rib to protect the information recorded on the disc d, and presses the tension ribs 48 on the opening cover 70 inward and pulls the opening cover 70 out, manually. Accordingly, the locking projections 46 locked into the locking recesses 30h are released, and the opening cover 70 is detached from the cartridge case 30.

In such a situation, the elastic pressure parts 44 are returned to their initial positions, so that the disc d is elastically supported by the elastic pressure parts 44 and withdrawn together with the opening cover 70. More specifically, when the user slightly pulls out the opening cover 70 while pressing on the tension ribs 48 of the opening cover 70, the receiving ribs 42 are separated from the receiving recesses 34a of the intervening members 34, and accordingly, the elastic pressure parts 44, which have been forced outward from each other in the lateral direction, approach each other to hold the disc d securely.

In such a situation, the user separates the disc d from the opening cover 70, and places the bare disc d whose states are verified to be supported by the disc holding means of the opening cover 70. Then, the user pushes the opening cover 70 into the disc entry opening 37 of the cartridge case 30 until the locking projections 46 of the opening cover 70 are locked into the locking recesses 30h of the cartridge case 30. Accordingly, the outwardly inclined surfaces 42a of the receiving ribs 42 of the elastic pressure parts 44 come in contact with the inclined surfaces 34b of the intervening members 34, and then received into the receiving recesses 34a of the intervening members 34. As a result, the elastic pressure parts 44 widen outward from each other in the lateral direction, so that the disc d can be rotated in the cartridge case 30, smoothly.

Meanwhile, the opening cover 70 of the disc cartridge of the present invention is useful in an adaptor for using a disc of a diameter of 8 cm in an optical recording/reproducing device for a disc of a diameter of 12 cm.

As described above, according to the disc cartridge of the present invention, the user can accommodate or withdraw a disc into or from the disc cartridge via an opening cover, by attaching or detaching the opening cover, which is capable of holding the disc, with respect to the cartridge case. Accordingly, the user does not need to touch the disc directly while replacing the disc. As a result, the disc is protected from damage which is caused due to the fingerprints, scratches, etc.

Further, according to the disc cartridge of the present invention, there is no gap between the cartridge case and the opening cover, so that errors in recording and reproducing information onto/from the disc do not occur due to the prevention of the entrance of foreign substances.

Still further, according to the disc cartridge of the present invention, the user has greater convenience in handling the disc without directly touching the disc d by using the opening cover.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A cartridge for an information recording medium, comprising:

a cartridge case having an opening to receive the information recording medium;

an opening cover, detachably mounted to the cartridge case at the opening, to enable the information recording medium to be withdrawn or inserted with respect to the cartridge case, the opening cover having supporting ribs to support the information recording medium on an inner surface thereof;

a pair of elastic pressure parts, elastically formed on the opening cover, to elastically support the information recording medium to hold the information recording medium relative to the opening cover when the opening cover is not attached to the cartridge case;

receiving ribs integrally formed on leading ends of the pair of elastic pressure parts, respectively;

intervening members, formed on opposite inner sidewalls of the cartridge case, to slidably contact the receiving ribs, respectively, so as to push the receiving ribs when the opening cover is inserted into the cartridge case so that the pair of elastic pressure parts widen in a lateral direction of the information recording medium relative to each other;

means for firmly fastening the opening cover to the cartridge case to prevent a gap between the opening cover and the cartridge case when the opening cover is attached to the cartridge case; and positioning means for positioning the information recording medium, which is accommodated in the cartridge case, upward/downward at an exact position.

2. The cartridge as claimed in claim 1, wherein the opening cover comprises a gripping part formed on a front surface thereof, to enable the user to pull the opening cover away from the cartridge case.

3. The cartridge as claimed in claim 2, wherein the gripping part includes at least one symbol printed on the gripping part to indicate first and second sides of the information recording medium.

4. The cartridge as claimed in claim 1, wherein the information recording medium is a disc on and/or from which information is optically recorded and/or reproduced.

5. The cartridge as claimed in claim 4, wherein:

the cartridge case comprises a spindle opening and an extended opening to permit an optical pickup to access the disc by exposing a predetermined portion of the disc accommodated in the cartridge case, and a shutter, slidably disposed with respect to the cartridge case, to selectively open/close the spindle opening and the extended opening.

* * * * *

UNITED STATES PATENT AND TRADEMARK OFFICE
CERTIFICATE OF CORRECTION

PATENT NO.      : 6,912,724 B2
DATED           : June 28, 2005
INVENTOR(S)     : Jong-pil Park et al.

It is certified that error appears in the above-identified patent and that said Letters Patent is hereby corrected as shown below:

Title page,
Item [30], Foreign Application Priority Data, change "Sep. 9, 1919" to -- Sep. 9, 1998 --, and change "Mar. 23, 1998" to -- May 23, 1998 --.

Signed and Sealed this

Twentieth Day of September, 2005

JON W. DUDAS
*Director of the United States Patent and Trademark Office*